Feb. 25, 1958 T. W. WILLEMSE 2,825,014
SEMI-CONDUCTOR DEVICE
Filed Oct. 19, 1954 3 Sheets-Sheet 1
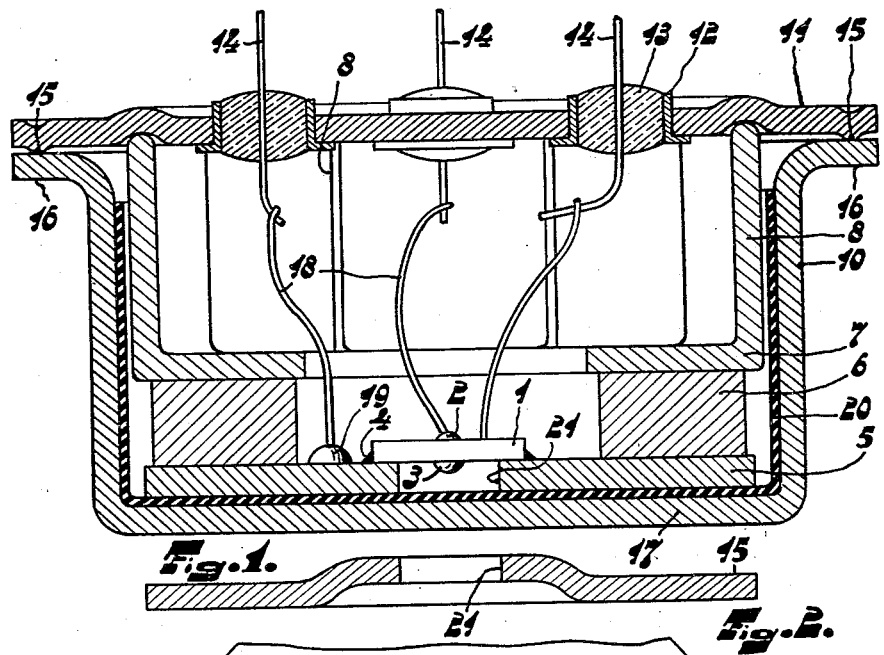
Fig. 1.
Fig. 2.
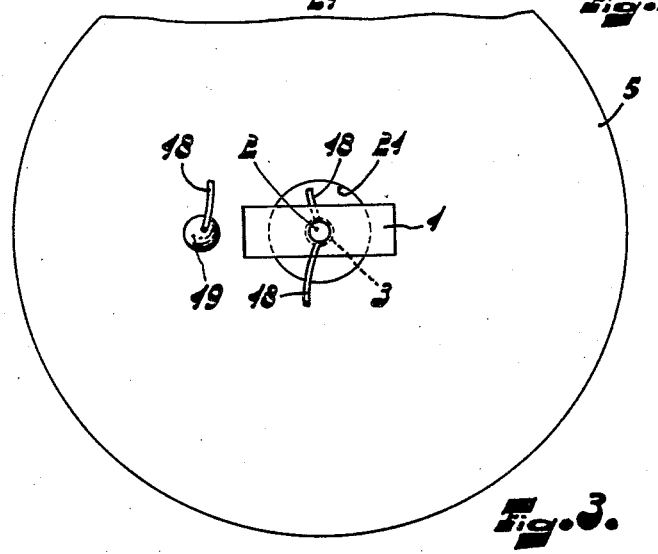
Fig. 3.
INVENTOR
THEO WILLEM WILLEMSE
BY
AGENT Feb. 25, 1958  T. W. WILLEMSE  2,825,014
SEMI-CONDUCTOR DEVICE
Filed Oct. 19, 1954  3 Sheets-Sheet 2
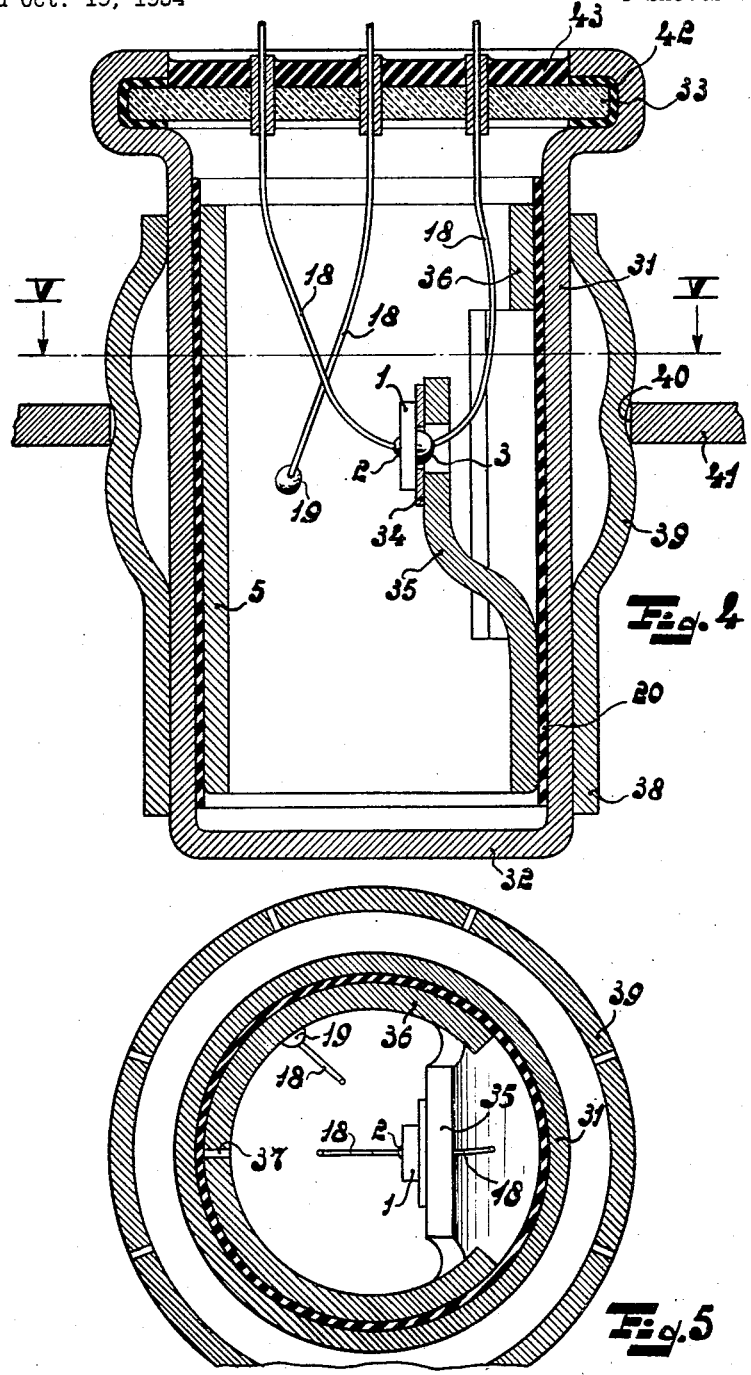
INVENTOR
THEO WILLEM WILLEMSE
BY
AGENT Feb. 25, 1958  T. W. WILLEMSE  2,825,014
SEMI-CONDUCTOR DEVICE
Filed Oct. 19, 1954  3 Sheets-Sheet 3
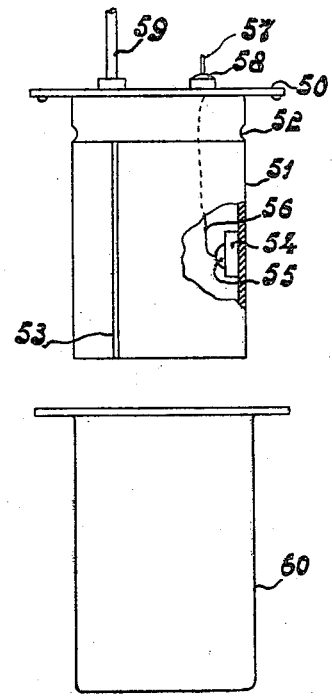
INVENTOR
THEO WILLEM WILLEMSE
BY
AGENT

# United States Patent Office 2,825,014
Patented Feb. 25, 1958

2,825,014

SEMI-CONDUCTOR DEVICE

Theo Willem Willemse, Eindhoven, Netherlands, assignor, by mesne assignments, to North American Philips Company, Inc., New York, N. Y., a corporation of Delaware Application October 19, 1954, Serial No. 463,271

Claims priority, application Netherlands November 30, 1953

3 Claims. (Cl. 317—234)

The invention relates to a semi-conductor device, more particularly a crystal diode or a transistor.

In such devices, a semi-conductive body may be secured to a supporting plate, for example, by soldering, the supporting plate then being soldered to the inner side of the wall of a suitable enclosure or housing. Thus, the heat produced by the electric current in the device is satisfactorily dissipated, i. e. through the supporting or cooling plate to the housing and the surroundings.

The invention has for its object, among other things, to provide a simple assembling of such a device. Moreover, by carrying out the invention, adverse reaction of the solder and the associated flux on the semi-conductive body can be avoided substantially completely. The invention furthermore permits of arranging the semi-conductive body and its contacts, which constitute an electrode system, so as to be electrically insulated from the housing.

According to the invention, the supporting or cooling plate is pressed or urged against the inner side of the housing over a surface which exceeds the surface part of the supporting plate covered by the electrode system. This is to be understood to mean that the surface pressed tight is at least five times larger than the part covered by the electrode system.

Since the supporting plate is pressed or urged against the housing the assembly may be materially simplified. The electrode system with the supporting plate can be finished and then secured in the housing by simple means. It is to be regarded as an advantage that there is very little chance of affecting the system adversely by detrimental substances or vapours, to which these systems are very sensitive.

Between the inner wall of the housing and the supporting plate provision may be made of an insulating layer, which increases the heat resistance only little and yet permits an electrically insulated arrangement of the system in a simple manner.

In a preferred embodiment, the housing is shaped in the form of a box with a closure, the supporting plate being pinched between these parts. In an alternative embodiment the housing has the shape of a tube, to the inner wall of which the supporting plate is pressed. In this case the supporting plate is urged against the housing preferably by its own spring force, or by a resilient body, for example a rubber plug arranged on the inner side of the supporting plate.

The invention will now be described more fully with reference to a few embodiments, or illustrated in the several figures of the accompanying drawing. The Figures are drawn on an exaggerated scale.

Fig. 1 is a sectional view of a housing in which a transistor is mounted.

Fig. 2 is a sectional view of a supporting plate.

Fig. 3 is a plan view of the supporting plate with the transistor shown in Fig. 1.

Fig. 4 is a sectional view of a tubular housing with a transistor.

Fig. 5 is a sectional view taken on the line V–V of Fig. 4.

Fig. 6 is a view of a tubular diode.

Referring to Fig. 1 reference numeral 1 designates the semi-conductive body, for example a germanium crystal of the n-conductivity type. On the top side and on the bottom side are fused an emitter 2 and a collector 3 respectively, which may for example be made of indium. The semi-conductive body is soldered at the bottom at 4 to a supporting or cooling plate 5, which must have approximately the same expansion coefficient as the semi-conductive body. To this end an alloy of 54% of iron, 29% of nickel and 17% of cobalt, known under the name of "Fernico" may be used.

On the supporting plate bears a resilient or elastic ring 6, which may be made for example from natural rubber or synthetic rubber. The ring is pressed tight by a gland 7, which is also annular at the bottom and has four extensions 8 at the top, these extensions rising so to say up from the ring.

The assembly is arranged in a housing, constituted by a box 10 and a lid or closure 11. The lid supports a plurality of through-connection insulators, constituted by metal rings 12, in which a glass bead 13 and a through-connection wire 14 are sealed. The lid is provided at the periphery with a ridge 15, by means of which it is welded hermetically to an edge 16 of the box 10. The lid urges the supporting or cooling plate 5 by means of the extensions 8 of the gland 7 and the resilient ring 6 tightly against the bottom 17 of the housing 10.

By means of conductors 18 the parts 1, 2 and 3 of the transistor are connected to the through-connections 14. The connection to the body 1 is established through the supporting plate 5 and a soldering joint 19.

On the inner wall of the box 10 is provided an insulating layer 20. This prevents the supporting plate 5 and the semi-conductive body 1 from being in contact with the housing. This insulating layer may for example be made of lacquer or of a foil of insulating material, for example cellulose tri-acetate. The insulating layer is prolonged along the side wall of the box in order to provide a longer leakage path. The assembly of the various parts may be performed in the simplest manner by putting the lid 11, provided with the insulators with its inner side turned up and by putting thereon the gland 7 the ring 6 and the supporting plate 5 with the transistor. The supporting plate with the transistor may be previously cleaned by etching and, if necessary, be provided with a protecting layer. The conductors 18 may then be welded to the through-connections 14. The box 10 is then slipped over this assembly; the box is then soldered at 15 to the lid. Finally, the box can be exhausted by means of an exhaust tube, (not shown), which may be provided in the lid in the same manner as the insulators.

The through-connections 14 could be replaced by tubes, through which the conductors 18 could be introduced. However, then the conductors had to be soldered in the tubes, which, as stated above, could have a detrimental effect on the transistor.

In the embodiment described above the electrode system is constituted by a transistor, in which a conductor is provided at a collector on the bottom side of the semi-conductive body 1. In order to lead this conductor upwards, the semi-conductive body is arranged over an aperture 21 of the supporting plate 5, so that the conductor can be led upwards alongside the elongated body. (See Fig. 3.) In order to obtain more space below the transistor, the supporting plate 5 may be bent in the centre, as is shown in Fig. 2.

Of course, many variations of the fastening of the transistor or a diode to the supporting plate are possible.

In order to give an example of the possible size of such a system, it is stated that the semi-conductive body may be 4 x 3 x 0.5 mms., while the diameter and the height of the housing may be 30 mms. and 10 mms. respectively.

The housing of the transistor may be secured in various ways to the chassis of an electric apparatus. To the centre of the bottom 17 a bolt may be welded previously, this bolt being taken through the chassis and held by a nut. As an alternative, the housing may be clamped tight along the periphery for example in an envelope having resilient tags or in an aperture of a chassis plate having resilient tags.

In the embodiment shown in Fig. 4 the housing is constituted by a tube 31, having a bottom 32 and a lid 33. A transistor comprising a semi-conductive body 1, an emitter 2 and a collector 3, is secured through the intermediary of a "Fernico" plate 34 to a tag 35 bent out from a supporting plate 36. The supporting plate 36 is shaped in the form of a tube, which is split at 37 (Fig. 5). This supporting or cooling plate is pressed into the housing and thus has a satisfactory thermal contact with the housing. If the transistor should be insulated from the housing, an insulating layer 20 may be interpositioned.

The periphery of the housing 31 is surrounded tightly by an envelope 38, provided with a plurality of resilient tags 39, by means of which the assembly may be secured in an aperture 40 of a base plate 41, for example a part of a chassis.

In the embodiment shown in Fig. 4 and 5, the lid 33 does not contribute to the tightening of the supporting plate. It is shown here as a glass disc 33, which is secured by flanging with the aid of a gasket 42 in the top end of the tube 31. The through-connections of the wires 18 are constituted by tubes 44, sealed in the lid 33, the wires being soldered in these tubes. If necessary, an insulating mass 43 may be cast on the lid.

In this construction first the supporting plate 36 must be pressed into the housing, then the lid must be set in place.

Of course, the supporting plate may be pressed into the tube by means of the lid, in the manner shown for the construction of Figs. 1 and 2. In this case the parts accommodated in the housing may be arranged in the inner side of the lid, for example in the manner shown diagrammatically in Fig. 6.

As shown in Fig. 6, to the lid 50 is secured a supporting plate 51 in the form of an envelope. In order to avoid tensions in the material during subsequent mounting, this envelope may be provided near the lid with a resilient part, shown in the form of a ridge 52. At 53 the envelope is split. On the inner side of the envelope is provided a crystal diode, constituted by a semi-conductive body 54 and fused electrode 55. The latter is connected via a conductor 56 to a through-connecting wire 57, sealed in an insulator 58. In the lid is sealed, moreover, an exhaust tube 59.

After the assembly has been mounted and, if necessary, cleaned, for example by etching, it may be pressed into the housing 60 and the edge of the lid may be welded to the edge of the housing. Then, by means of the exhaust tube 59, the housing may be evacuated or filled with a protecting gas, after which the tube is closed by sealing.

In this diode, the semi-conductive body 54 is in direct electric contact with the housing.

If the spring force of the supporting plate is not sufficient in itself to ensure a satisfactory thermal contact with the housing, a resilient or elastic body for example a separate metal spring or a rubber plug may be provided within the supporting plate 51. In the latter case the pressure may be raised in a simple manner when pressing down the lid, since if the lid would urge the rubber plug in an axial direction, and the plug would expand in radial direction and thus urge the supporting plate 51 tightly against the housing 60.

In the embodiments described above, one electrode system is shown in a housing. Of course, as an alternative more than one electrode system may be arranged in one housing. One or more of these systems may be arranged on one supporting plate and, of course, more than one supporting plate may be arranged in one housing.

What is claimed is:

1. An electrical device comprising a substantially cylindrical housing having wall portions including a bottom portion and an open top, a closure secured to and sealing said open top of said housing, a semi-conductor device including a semi-conductive body and at least one electrode coupled thereto, a cooling plate, said semi-conductor device being mounted on and secured to said cooling plate, said cooling plate and semi-conductor device mounted thereon being disposed within said housing, and elastic pressure-transmitting means disposed within the housing between the closure and the cooling plate and being urged by said closure against the cooling plate, which in turn is urged against a wall portion of said housing.

2. An electrical device comprising a substantially cylindrical metal housing having a flat bottom and an open top, a thin layer of electrically insulating material on the inner surface of said housing, a circular cooling plate disposed on the bottom of said housing on said insulating layer, a semi-conductive body secured to said cooling plate, at least one electrode coupled to said semi-conductive body, a substantially circular elastic member surrounding said semi-conductive body and abutting said cooling plate, and a closure secured to and closing off the open top of said housing, said closure urging said elastic member against said cooling plate, which in turn is urged against the flat bottom of said housing.

3. An electrical device as set forth in claim 2 wherein means are provided securing the semi-conductive body to the cooling plate, the elastic member being of insulating material, and wherein terminal connections secured to the electrode and the semi-conductive body are sealed through the closure of the housing.

References Cited in the file of this patent

UNITED STATES PATENTS

| | | |
|---|---|---|
| 2,182,377 | Guanella | Dec. 5, 1939 |
| 2,545,863 | Sell et al. | Mar. 20, 1951 |
| 2,665,399 | Lingel | Jan. 5, 1954 |